United States Patent [19]

Plummer

[11] 3,718,078
[45] Feb. 27, 1973

[54] SMOOTHLY GRANULATED OPTICAL SURFACE AND METHOD FOR MAKING SAME

[75] Inventor: William T. Plummer, Concord, Mass.

[73] Assignee: Polaroid Corporation, Cambridge, Mass.

[22] Filed: Dec. 31, 1970

[21] Appl. No.: 103,199

[52] U.S. Cl. .................. 95/49, 88/1.5 R, 95/42, 350/127, 350/129, 350/211, 264/1, 364/343
[51] Int. Cl. .............................................. G02b 3/08
[58] Field of Search ........ 88/1.5; 95/42, 49; 350/211, 350/188, 127, 128, 129; 264/1, 341, 343

[56] References Cited

UNITED STATES PATENTS

| | | | |
|---|---|---|---|
| 1,926,732 | 9/1933 | North | 350/129 |
| 2,348,818 | 6/1944 | Jacobson | 350/127 X |
| 2,466,338 | 4/1949 | Traub | 350/129 X |
| 2,589,014 | 3/1952 | McLeod | 350/188 X |
| 2,914,997 | 12/1959 | Grey | 350/211 X |
| 3,087,375 | 4/1963 | Papke | 88/1.5 R |
| 3,523,720 | 8/1970 | Schiele | 350/211 |

FOREIGN PATENTS OR APPLICATIONS 1,485,369  5/1967  France .................. 350/188

Primary Examiner—Samuel S. Matthews
Assistant Examiner—Michael D. Harris
Attorney—Brown & Mikulka, William D. Roberson and Frederick H. Brustman

[57] ABSTRACT

A method for forming a light-scattering surface in which the surface, made from a soluble material, is sprayed with droplets of a volatile solvent. After the droplets evaporate, the surface is found to be smoothly perturbated. Molds can be made of the perturbated surface from which duplicates can be pressed in large numbers and in a variety of materials. A surface perturbated according to the present process is useful in optical articles for randomly distributing, within a predetermined solid angle, light incident on said surface. Applications for the light-scattering surface include: focusing screens; fresnel condenser optics; and, non-glare windows.

20 Claims, 8 Drawing Figures

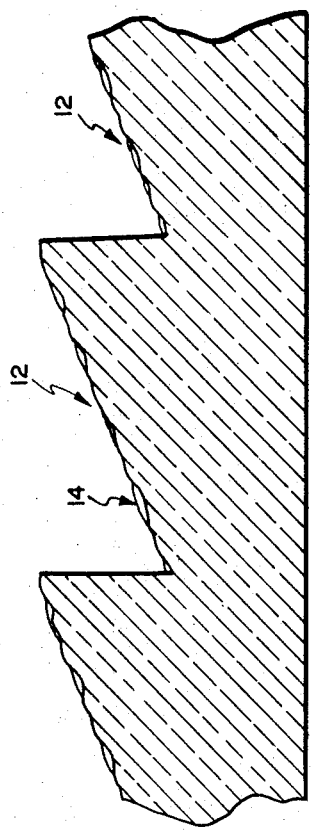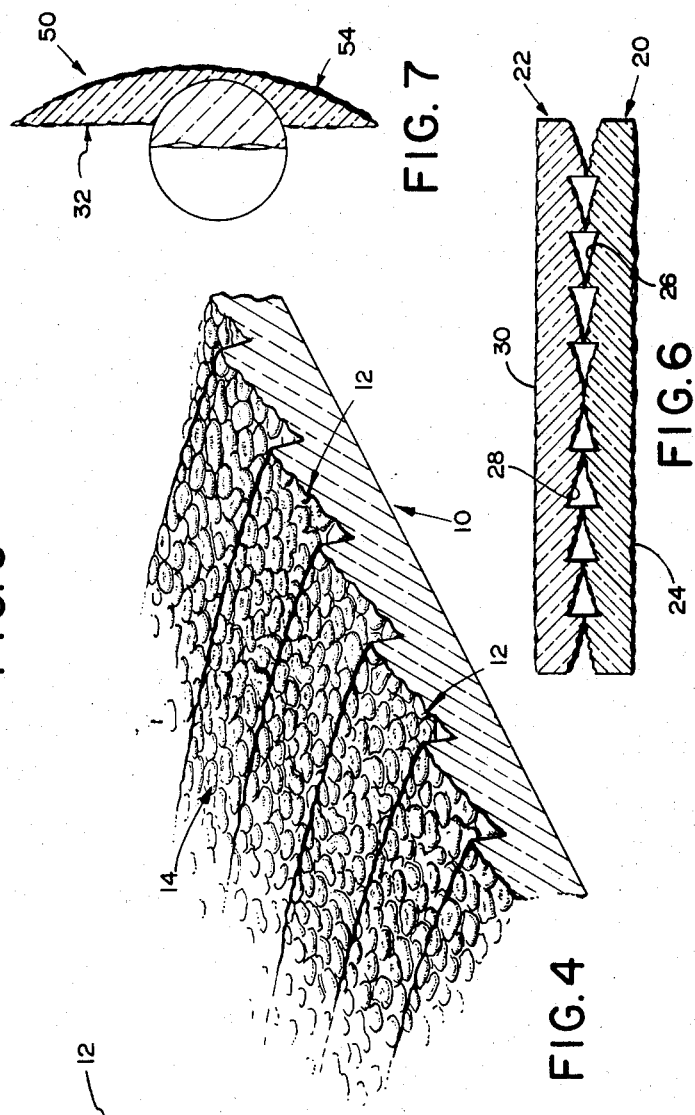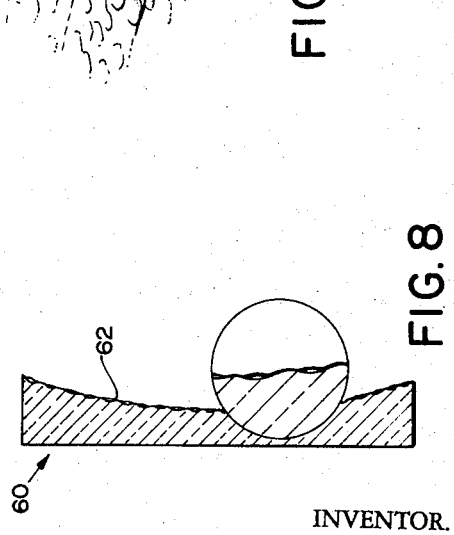

SMOOTHLY GRANULATED OPTICAL SURFACE AND METHOD FOR MAKING SAME

BACKGROUND OF THE INVENTION

The present invention particularly concerns diffusing optical surfaces. Diffusing optical surfaces are often used on focusing screens for cameras and on glass sheets to make so-called non-glare glass for picture frames.

Previously known processes for making optical surfaces which will diffuse light are of two principal types: grinding with various abrasives, and etching with acid. Either process typically produces a surface which is rough and pitted, albeit on a miniature scale, and which will consequently scatter incident light rays in every direction.

A surface characterized by smooth bumps or granulations or other perturbations, as opposed to jagged edged pits, has several advantages. Principal among them is that the light incident on such a surface is ramdomly distributed within a predetermined solid angle related to the slope of the perturbations. One use of such a surface is on novel focusing screen for a camera; in particular, a focusing screen which must be viewed through an opening of fixed size, e.g., the pupil of an eye or an aperture stop. By means of the process described herein, the focusing screen can be made so it will direct all the light of an image incident thereon through the fixed opening, but the light will be randomly dispersed. Thus, the focusing feature of the screen is retained due to the random dispersion, while the brightness of the image is preserved by using all the incident light. This and other advantages of the invention plus several applications are set forth below in greater specificity.

SUMMARY OF THE INVENTION

The bumps or granulations or other perturbations hereinafter referred to as granulations on a surface are formed so the maximum slopes of their sides are small, typically 2° – 3° but for certain applications, other slopes will be seen to be useful. The nominal trough-to-peak height of the granules is on the order of one-quarter to one-half wavelength of light. As well as can be determined, the topographical contours of the granular surface are smooth and free from cusps.

A useful property of such granulated optical surfaces is that there is a significant difference in magnitude between the dispersion due to refraction through the surface and the dispersion due to reflection from the surface. In fact, the dispersion due to refraction can be reduced to an amount which can be ignored, while the dispersion due to the reflection remains appreciable. This has applications which will be explained below.

The process for granulating the surface, which is set forth in greater detail below, usually begins by forming the surface, without the granulations, from a soluble plastic, preferably cellulose acetate butyrate. The surface is sprayed with droplets of a volatile solvent, preferably 1,2-dichloroethane. Action on the surface due to the droplets of solvent redistributes the material of the surface while the solvent evaporates, thereby forming the granulations on the surface. The spraying is repeated until a desired density of granulations is achieved. In those cases where a desired article having a granulated surface must be made from a material unsuited to the foregoing process, the process can instead by used to make a model of the desired article. From that model, molds can be made by known methods. The molds, in turn, are used to duplicate the model in a particular material to produce the desired article.

An object of the present invention is to provide on optical surface that randomly disperses the light rays of an incident beam of light within a predetermined solid angle.

Another object of the present invention is to provide a process for granulating the surface of an optical article.

Yet another object of the present invention is to provide an echelon focusing screen which randomly disperses light incident thereon within a predetermined solid angle by means of a randomly granulated surface thereon which has smooth contours.

Other objects of the invention will in part be obvious and will in part appear hereinafter.

The invention accordingly comprises several steps and the relation and order of one or more of such steps with respect to each of the others, and the product possessing the features, properties and the relation of elements which are exemplified in the following detailed disclosure, and the scope of the application of which will be indicated in the claims.

DESCRIPTION OF THE DRAWINGS

For a fuller understanding of the nature and objects of the invention, reference should be had to the following detailed description taken in connection with the accompanying drawings wherein:

FIG. 3 illustrates an echelon mirror treated according to the present process to promote the mirror's use as a focusing screen;

FIG. 4 illustrates an enlarged section, in perspective, of the echelon mirror of FIG. 3;

FIG. 5 illustrates a cross-section taken through the echelon mirror of FIG. 3;

FIG. 6 illustrates a cross-section through a pair of fresnel (echelon) lenses;

FIG. 7 illustrates a cross-section of a lens according to the present invention; and FIG. 8 illustrates a cross-section of a mirror according to the present invention.

DESCRIPTION OF THE PREFERRED EMBODIMENT

THE METHOD

Figure 1:
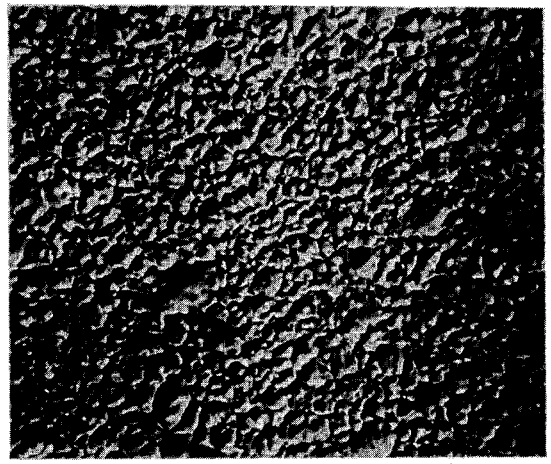
FIG. 1 reproduces a photo-micrograph of a granular surface made according to the present process.

The initial step in forming an article with a surface having the novel properties sought herein is to fabricate the article, without the granular surface finish, in a soluble material; cellulose acetate butyrate is preferred.

In certain circumstances, such as where the desired article is to be made from a material other than cellulose acetate butyrate or where large numbers of the article are required, a model of the article, in cellulose acetate butyrate, is used instead. It is also within the scope of the present invention to make the article from some other material and provide an appropriate surface with a skin of cellulose acetate butyrate.

A volatile solvent is sprayed in droplets onto the cellulose acetate butyrate surface. A preferred solvent is 1,2-dichloroethane, sometimes known as ethylene dichloride or ethylene chloride. 1,2-dichloroethane is quite volatile and cellulose acetate butyrate is highly soluble in it. It has been found that a small amount of methyl methacrylate dissolved in the 1 2-dichloroethane promotes the desired action of the solvent. Approximately 0.05 percent by weight of methyl methacrylate in 1,2-dichloroethane is quite suitable. Spraying this mixture onto a glass surface leaves no discernible residue after the solvent evaporates. Therefore, the methyl methacrylate is felt to promote the desired action in some other way, perhaps as a wetting agent or as a catalyst. It will now be clear that using methyl methacrylate in the 1,2-dichloroethane is a means of controlling the process' action since it promotes the action of the solvent compared to the solvent without it. Another means of controlling the solvent's action, and thereby the process, is to dilute the solvent somewhat with a liquid which will not dissolve the cellulose acetate butyrate, e.g., ethyl alcohol. Ethyl alcohol reduces the desired action of the solvent in relation to its concentration therein, until its concentration reaches about 10 percent, by weight, at which point the desired action nearly ceases to occur.

While additions to the solvent seem to affect the rate of the action, variations in spraying techniques appear to affect the size of the granular pattern on the surface. For reasons explained below, it is believed that the overall granular pattern is the composite result and interaction between a single droplet and that part of a surface the droplet impinges on. Consequently, one can appreciate that the size of the granules is dependent on the size of the droplets as they impinge on the surface. Therefore, it can be controlled somewhat by spraying technique in at least two ways: (1) modifying the spraying equipment to produce finer droplets; and, (2) increasing the distance the droplets must travel to reach the surface. The latter technique relies on evaporation of the solvent from the droplet in flight to reduce its size. It should be noted that the size of the granules might be reduced, using these or other techniques, so they will no longer act on light, but they will still be detectable (e.g., by electron microscopy).

The volatile solvent, 1,2-dichloroethane, evaporates quickly from the surface. Consequently, the individual droplets do not coalesce with one another on the surface because they arrive there widely dispersed and any individual droplet will have completed its action and have evaporated before a subsequently arriving droplet is likely to impinge in its immediate vicinity. The controlled application of the solvent and the solvent's volatility preclude the puddling of droplets and the flooding of the surface. It is now known, by test, that merely flooding or wetting the entire surface with the solvent will not produce a desired result. Furthermore, flooding the surface with solvent is more than likely to adversely affect any fine structure on the article's surface (e.g., individual rulings in an echelon lens); whereas, spraying the solvent on does not seem to affect the surface and the fine structure thereon except for adding the desired granular contours.

While cellulose acetate butyrate and 1,2-dichloroethane are presently preferred over other materials, it is also known that the plastic cellulose acetate propionate can be used to form the initial article, and that chloroform can be used as the volatile solvent. It is within the scope of the present invention to use other materials in addition to the preceding ones. The material chosen for the article should be highly soluble in the solvent; the solvent itself should be sufficiently volatile to prevent individual droplets from coalescing at the chosen application rate.

EXAMPLE I

A flat sheet of cellulose acetate butyrate is sprayed with droplets of 1,2-dichlorothane. The droplets are formed and applied by means of a commercially available air brush. The air brush is held several inches from the sheet and stroked back and forth during the spraying operation. Occasionally the surface may be examined to determine the extent to which it has been granulated.

This is done by inspecting the surface with a microscope, or by viewing a reflection of a small light source from the sheet to determine the amount of uneffected (non-dispersing) surface remaining. The slope angles of the granules can be determined by measuring the angular dispersion in a beam of light reflected from the granulated surface. As the spraying is continued until the entire surface is granulated, the angular dispersion achieved by the present process is, to a large degree selflimiting; further spraying does not substantially increased the local slope angles. This property is useful in obtaining uniform results.

FIG. 1 is a photo-micrograph of a portion of the flat sheet of cellulose acetate butyrate processed according to Example I. The transparent sheet was photographed at an initial magnification of 160X using bright field illumination in reflection from the processed surface.

EXAMPLE II

An echelon focusing screen for use in a camera and viewer arrangement described in copending U. S. Patent Application Ser. No. 98,356, filed Dec. 15, 1970, in the name of James G. Baker, entitled "Reflex Camera and Viewing Device", and assigned to Polaroid Corporation may be made by first forming a model, in brass, of the echelon focusing screen, but without the granular surface of the present invention. Using techniques well known in the sound recording industry, a mold may be made from the brass model from which another model of the echelon focusing screen may be pressed in cellulose acetate butyrate. The echelon of the cellulose acetate butyrate model may be sprayed with 1,2-dichloroethane in a manner of Example I. Applied in the manner of Example I, the solvent will be found to have no noticeable effect on the fine individual rulings comprising the echelon other than creating desired granulations. After the echelon of the cellulose acetate butyrate model is granulated, a mold may be made from it using the same techniques well known in the sound recording industry. Using that mold, multiple copies of the echelon focusing screen may be pressed, but with the special light-scattering surface of the present invention on echelon.

Figure 2:
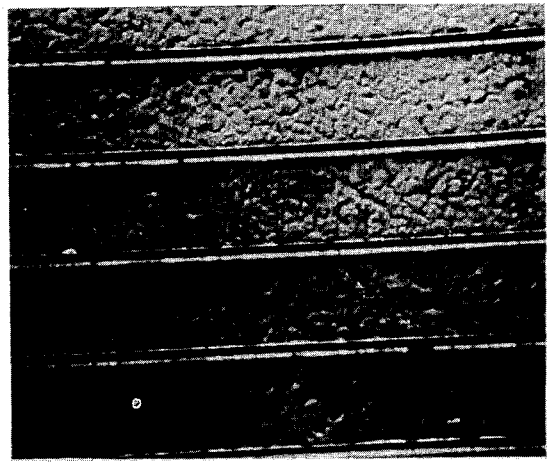
FIG. 2 reproduces a photo-micrograph of an area on the surface of an optical element pressed from a mold.

FIG. 2 is a photo-micrograph of a portion of an actual echelon focusing screen of Example II. The initial photo-micrograph was made at 160X using bright field illumination. Each ruling was about 0.125mm wide (the distance between lines in the photomicrograph of FIG. 2), and about 0.05mm high, in the photographed region of the echelon focusing screen. The microscope was focused at half the height of the rulings.

The following description explains the theory of the present process as it is now believed, but no representation is made that the mechanism of the process is exactly understood.

An individual droplet of 1,2-dichloroethane impinges on the cellulose acetate butyrate surface and is believed to dissolve a small amount of the plastic over the surface area it wets. The dissolved plastic remains within the droplet while the droplet contracts from its original size as the solvent evaporates.

Presumably, the solvent in the droplet is not saturated by the dissolved plastic; therefore, as the evaporation continues, the concentration of the plastic in the solvent can readily increase. Consequently, the original weight of plastic remains dissolved in the droplet and as the droplet evaporates it is carried toward the last remaining wetted locations. Eventually, the solvent evaporates completely, leaving a concentration of plastic redistributed within the area of the drop. Since this material transport arrangement is continuous without any abrupt changes once the droplet strikes, the resulting contours are smooth.

The height and slope of the granules are related to droplet size at impingement, the solubility of the surface in the solvent, the volatility of the solvent, and perhaps other factors. For example, it is known that flooding the surface with the solvent will not produce the desired result; therefore, each droplet should evaporate before another impinges in its immediate vicinity to coalesce with it. Thus, each droplet acts individually. The resulting granular surface is the result of the cumulative effect of many droplets.

APPLICATIONS FOR THE NOVEL GRANULAR SURFACE FINISH OF THE PRESENT INVENTION

FIG. 3 illustrates a focusing screen 10 made according to Example II. In the arrangement described by the aforementioned copending application, Ser. No. 98,356, an objective lens forms an image of a subject on the focusing screen 10. To obtain the maximum image brightness in an associated viewer, the focusing screen 10 is formed as a plurality of specularly reflecting echelon rulings 12 oriented to reflect light in the image received from the objective lens toward the associated viewer by means of a reflecting surface 14 (see FIG. 4 and 5) on each ruling 12. The plurality of echelon rulings effectively images the aperture stop of the lens onto the aperture stop of the viewer. By providing the reflecting surface 14 with a smoothly contoured granular finish, the ability of an observer to judge when the subject's image is focused precisely on the focusing screen is enhanced. The enhancement is due to the granular finish.

Because the randomly positioned granules have a nominal peak-to-valley height of about one-half wavelength of light, they introduce a randomly distributed full wavelength difference, point-to-point, in a wavefront reflected from the reflecting surface 14 of the echelon ruling 12. The doubling to one wavelength is due, of course, to the reflection. The smooth contours and limited slope of the granules do not scatter the light reflected from the focusing screen (with attendant loss of light reaching the aperture of the viewer) but randomly distribute the light within a limited solid angle directed toward the aperture of the viewer; therefore, no substantial light loss is caused by the granular finish. The solid angle is chosen as may be appropriate for the aperture of the objective lens.

The granular finish does not affect images focused precisely on it by the lens. However, images focused even a small distance from the surface 12 appear blurred to the observer. The blurring increases with the focusing error.

Several other applications of the present granular finish for optical surfaces are based on the difference in magnitude found between its effect on reflected light wavefronts and refracted light wavefronts. Taking for illustration a smoothly contoured granular finish with a nominal peak-to-valley height of one wavelength, it is found that a wavefront reflected from the granulated surface will have point-to-point phase difference of two wavelengths due to the doubling on reflection. But a refracted wavefront will have a point-to-point phase difference of only one-half wavelength because the difference on refraction is proportional to $n_1 - n_2$, where $n_1$, for most materials is on the order of 1;5, and $n_2$ is typically air and equals 1.9. Thus, the granular finish according to the present invention will have about four times the effect on reflected light that it has on refracted light.

By the Rayleigh criterion, a wavefront is nominally perfect for the eye if local phase differences are less than one-quarter wavelength. One can now appreciate that if the peak-to-valley height of the granules is reduced to about one-half wavelength (which is practical by the process described above) the reflected wavefront still has obvious phase differences of about one full wavelength, but the refracted wavefront has phase differences of only one-quarter wavelength which borders on perfection by the Rayleigh criterion. Thus, an optical surface can now be given a surface finish by the present process which will transmit essentially perfect images, but deteriorate or scatter any reflected images.

With optical surfaces having a nominal peak-to-valley height of one-half wavelength of light, it has been observed that fine print can be read through the samples even though the print is some distance from the sample, but images reflected at near normal incidence appear quite fuzzy and blurred. A transparent sheet having the granular surface according to the present invention can be used in a picture frame or in other applications where specular reflection from the surface of the sheet would detract from the scene to be viewed through the sheet.

Unlike previous materials used for this purpose in picture frames, a surface granulated according to the present invention can be substantially separated from the picture or other object which is to be viewed through it. Thus, it can be used for protective windows on a box for display of solid objects, or for other applications (such as the non-glare polarizing screen for a cathode ray tube) where the window is tilted with respect to a viewed surface.

FIG. 6 illustrates another optical application of a granular surface finish on fresnel condenser lenses 20 and 22 for overhead projectors and other apparatus. In an overhead projector, the fresnel condenser lenses are arranged to form an image of a light source (not shown) in a projection lens (not shown) to most efficiently utilize the available light.

At each interface between a fresnel lens surface and the air 24, 26, 28, and 30, at least 4 percent of the incident light is reflected rather than transmitted. Thus, four percent of the light incident on interface 26 is reflected back toward interface 24 which will, of course, reflect 4 percent of the four percent toward the projection lens.

While the amount of light reaching the projection lens is small, the total from all possible multiple reflections can be significant. The extraneous reflections of the fresnel lens surface reach a viewing screen through the projection lens, reduce the contrast of a projected image, and often appear there as annoying bright spots. Fresnel condenser lenses with optical surfaces according to the present invention cause much of the reflected light to miss the projection lens because of the greater dispersion of reflected light by the granular finish. The granular finish does not appreciably affect the transmitted component of the light for the reasons given above. In this manner, contrast reduction and bright spots are minimized by preventing light which would cause them from reaching the viewing screen.

Referring to FIGS. 7 and 8, two other applications of the present invention are shown. FIG. 7 illustrates a lens 50 having granular surfaces 52 and 59 according to the present invention. FIG. 8 illustrates a mirror 60 having a granular reflecting surface 62 according to the present invention.

Since certain changes may be made in the above process and articles without departing from the scope of the invention herein involved, it is intended that all matter contained in the above description or shown in the accompanying drawings shall be interpreted as illustrative and not in a limiting sense.

What is claimed is:

1. On a focusing screen, for a camera, having echelon means for forming an image of an aperture stop, the improvement comprising:
   a plurality of smoothly contoured granular shapes randomly distributed on said echelon means and coextensive therewith for randomly dispersing light incident thereon.

2. The improved focusing screen described in claim 1, wherein the slope on the side of said granular shapes does not exceed three degrees.

3. The improved focusing screen described in claim 1, wherein the height of said granular shapes is on the order of a wavelength of light.

4. On a focusing screen characterized by echelon mirror means for reflecting an image of a first aperture stop to a second aperture stop, the improvement comprising:
   a plurality of smooth granular contours on said echelon mirror means, said smooth granular contours characterized by a maximum slope of three degrees and a peak-to-valley height on the order of a wavelength of light, said contours and the interstices between them being free of cusps.

5. A fresnel lens, comprising:
   a first surface;
   a plurality of echelon rulings situate on said first surface of said fresnel lens;
   a second surface; and
   a plurality of smoothly contoured shapes, situate on at least one of said first and said second surfaces and randomly distributed thereon, for randomly dispersing light incident thereon within a predetermined solid angle.

6. The fresnel lens of claim 5, wherein said smoothly contoured shapes and the interstices between them are free of cusps and said shapes have a maximum peak-to-trough height of one light wavelength with a maximum slope on the sides of said shapes equal to 3°.

7. The fresnel lens of claim 6, wherein said plurality of smoothly contoured shapes is situated on said first surface as represented by said plurality of echelon rulings.

8. On a focusing screen, for a camera, having echelon means for forming an image of an aperture stop and specular means, on said echelon means, for reflecting light therefrom, the improvement comprising:
   granular shapes coextensive with said echelon means and randomly distributed and closely spaced thereon, said granular shapes characterized by smooth contours with both the granular shapes and the interstices between said granular shapes free of cusps, and said granular shapes having a maximum peak-to-trough height of one wavelength of light with a maximum slope on the sides of said granular shapes equal to 3°.

9. A method comprising the steps of:
   forming an article having a surface made from a soluble material;
   spraying droplets of a solvent so said droplets impinge upon said surface; and
   evaporating said droplets which impinge upon said soluble material of said surface prevent said droplets from coalescing with droplets subsequently impinging upon said surface whereby said is reshaped.

10. The method described in claim 9, further comprising the steps of:

changing the distance said droplets travel before they impinge on said surface so as to alter their size at said surface; and modifying said solvent to control its interaction with said soluble material.

11. The method described in claim 9, further comprising the steps of:

dissolving some of said soluble material of said surface into said droplets which impinge upon said surface; and depositing the dissolved material onto said surface as said droplets evaporate.

12. The method described in claim 9, wherein said solble material is selected from the group consisting of: cellulose acetate butyrate and cellulose acetate propionate; and the solvent is 1,2-dichloroethane.

13. The method described in claim 9, wherein said soluble material is selected from the group consisting of: cellulose acetate butyrate and cellulose acetate propionate; and the volatile solvent is chloroform.

14. The method described in claim 9, further comprising the step of:
 duplicating said article after said surface is reshaped.

15. A method for manufacturing an optical article, comprising the steps of:
 forming said optical article with a surface made from a soluble material;
 spraying droplets of a solvent so said droplets impinge upon said surface; and
 evaporating said droplets which impinge upon said soluble material of said surface prevent said droplets from coalescing with droplets subsequently impinging upon said surface whereby said surface is reshaped having smoothly contoured, randomly placed granular forms.

16. The method described in claim 15, further comprising the steps of:
 changing the distance said droplets travel before they impinge on said surface so as to alter their size at said surface; and
 modifying said solvent to control its interaction with said soluble material.

17. The method described in claim 15, further comprising the steps of:
 dissolving some of said soluble material of said surface into said droplets which impinge upon said surface; and
 depositing the dissolved material onto said surface as said droplets evaporate.

18. The method described in claim 15, wherein said soluble material is selected from the group consisting of: cellulose acetate butyrate and cellulose acetate propionate; and the solvent is 1,2-dichloroethane.

19. The method described in claim 15, wherein said soluble material is selected from the group consisting of: cellulose acetate butyrate and cellulose acetate propionate; and the solvent is chloroform.

20. The method described in claim 15, further comprising the step of:
 duplicating said article after said surface is reshaped.

* * * * *